United States Patent [19]
Uemura

[11] Patent Number: 6,050,178
[45] Date of Patent: Apr. 18, 2000

[54] CONTINUOUS LIQUID PASTEURIZING APPARATUS AND A METHOD THEREOF

[75] Inventor: Kunihiko Uemura, Ibaraki, Japan

[73] Assignee: Japan as Represented by Director of National Food Research Institute, Ministry of Agriculture, Forestry and Fisheries, Ibaraki, Japan

[21] Appl. No.: 09/260,418

[22] Filed: Mar. 1, 1999

[30] Foreign Application Priority Data

Oct. 9, 1998 [JP] Japan .................................. 10-287546

[51] Int. Cl.⁷ ........................................................ A23L 3/32
[52] U.S. Cl. .............................. 99/451; 99/452; 99/483; 99/DIG. 14; 426/521; 426/244
[58] Field of Search .............................. 99/451, 452, 483, 99/DIG. 14; 426/234, 237, 238, 521, 244, 247; 422/22, 23, 24; 219/700, 735; 392/338, 497

[56] References Cited

U.S. PATENT DOCUMENTS

| | | | |
|---|---|---|---|
| 5,226,106 | 7/1993 | Stirling | 99/451 X |
| 5,235,905 | 8/1993 | Bushnell et al. | 99/451 |
| 5,562,024 | 10/1996 | Polny, Jr. | 99/451 |
| 5,662,031 | 9/1997 | Qin et al. | 99/451 |

*Primary Examiner*—Reginald L. Alexander
*Attorney, Agent, or Firm*—Carrier, Blackman & Associates, P.C.; Joseph P. Carrier; William D. Blackman

[57] ABSTRACT

A continuous liquid pasteurizing apparatus and method for effectively pasteurizing microbes or bacteria having heat-resistance and/or pressure-resistance, such as sporangium, with low temperature or by maintaining a high temperature for a short time, wherein an electricity conducting unit (9) for pasteurizing the liquid is provided within a pressurized container (1), and an upper end portion of the electricity conducting unit(9)is connected to a supply opening (3)for liquid, while a lower end portion thereof is connected to a reservoir portion(10)which is cooled by a cooling mechanism involving heat exchange with cooling water(7). The thus-pasteurized liquid is reserved in a reservoir portion (10)and is taken out from an outlet opening(4)through a conduit (11)outside the container(1).

16 Claims, 6 Drawing Sheets

Orig.: Not-processed
M.W. : Microwave Heating (Up to 130°C)
B.H. : Hot Bath Heating (100°C, for 5 minutes)
E.S. : Heating-Electricity Conducting Pasteurization
(Up to 130°C, 11.5 kv/cm)

FIG. 8

CONTINUOUS LIQUID PASTEURIZING APPARATUS AND A METHOD THEREOF

BACKGROUND OF THE INVENTION

1. Field of the Invention

The present invention relates to a liquid pasteurizing apparatus and a method thereof for pasteurizing liquid, such as drinking water, beverages such as juice or beer, or water for industry use, and in particular, to a continuous pasteurizing apparatus and a method therefor that is able to continuously pasteurize such liquids which are supplied continuously.

2. Description of Related Art

Conventionally, for disinfecting or pasteurizing liquid such as drinking water or the like, methods of boiling water by heating thereof or putting disinfectant or germicide into the water are already widely known and actually practiced. However, these methods have drawbacks in that sometimes sufficient effect cannot be obtained therewith, and further these methods sometime adversely affect even necessary constituents (e.g. vitamins, etc.) in the processed liquids.

Recently, attention was paid to a method in which the liquid is pasteurized by applying a strong electric field obtained between electrodes positioned close to each other, to which alternating current (AC) voltage is applied, and this method is taught in Japanese Patent Application No. Hei 10-40133 (1998).

In the method proposed in the above-mentioned patent application, an opening is formed in a wall surf ace of an insulating material forming part of a liquid passage, and in this opening there are provided at least a pair of electrode wires extending horizontally, to which the AC voltage is applied.

The above-mentioned pasteurizing method in which the liquid passes within the high electric field, although effective against many kinds of bacteria or microbes, is not fully effective as a pasteurizing method for microbes or bacteria having heat-resistance and/or pressure-resistance, such as sporangium, etc.

SUMMARY OF THE INVENTION

Therefore, an object in accordance with the present invention is to provide a continuous liquid pasteurizing apparatus and a method thereof, with which continuous and effective pasteurization of liquid can be obtained, without destroying or decomposing essential components such as vitamin C, etc., by using the effect of an electric field.

For achieving the object mentioned above, in accordance with the present invention, there is provided a continuous liquid pasteurizing apparatus for pasteurizing liquid, comprising:

a pressurized container having a supply opening and an outlet opening for liquid; and an electricity conducting unit provided within said pressurized container, wherein a liquid passage is formed in said electricity conducting unit into which flows the liquid supplied from said supply opening, which is confronted by at least a pair of electrodes which are connected to an alternating current voltage source.

With this construction, an electric field is formed through or in the passage into which the liquid flows and by applying AC voltage to the pair of electrodes, the liquid is thereby pasteurized continuously by the electric field.

Since the temperature of the liquid is increased as a result of the so-called resistance heating effect, it is preferable to provided a cooling means in said pressurized container for cooling the high-temperature liquid, thereby protecting heat-sensitive constituents—such as vitamins, etc.—from being decomposed or destroyed.

Further, the liquid pasteurized in the electricity conducting unit can be taken out directly from said pressurized container. However it can also be taken out from a reservoir portion into which the pressurized liquid is temporarily reserved and cooled.

With provision of such a reservoir portion, if the reservoir portion is filled up with liquid cooled to below 100° C., a level sensor installed on a cover of the reservoir opens an electromagnetic valve which is provided at the outlet opening of the liquid, thereby allowing the liquid in the reservoir portion to be transferred outside the container through a conduit from the outlet opening for liquid, so as to further cool it down to a predetermined temperature in a secondary cooling portion provided outside the container.

Further, the structure of said electricity conducting unit is conceivable as having a plurality of laminated insulating material layers, among which are inserted the electrodes. With this, since the liquid passes through the pasteurizing portion a plurality of times, the pasteurizing effect can be increased.

Further, in the continuous liquid pasteurizing method using the continuous liquid pasteurizing apparatus as described above, the applied electric field is equal to or greater than 5 kV/cm and a pressure within said pressurized container is equal to or greater than 0.2 MPa.

With an applied electric field less than 5 kV/cm, it is impossible to pasteurize bacteria or microbes having heat-resistance and/or pressure-resistance, such as sporangium, etc., by a low temperature or within a short time period of heating.

Further, since the liquid (e.g. water) is heated through the pasteurization process by electricity and is the temperature thereof can increase up to about 120° C., it is necessary, therefore, to keep the pressure inside the pressurized container higher than the saturated water vapor pressure (equal or greater than 0.2 MPa) to prevent boiling.

BRIEF DESCRIPTION OF THE DRAWINGS

FIG. 4(a) shows a plane view of an insulating body forming a top portion of the electricity conducting unit, and FIG. 4(b) a side view of the same;

FIG. 5(a) shows a plane view of an insulating body forming a middle portion of the electricity conducting unit, and FIG. 5(b) a side view of the same;

FIG. 6(a) shows a plane view of an insulating body forming a bottom portion of the electricity conducting unit, and FIG. 6(b) a side view of the same;

DESCRIPTION OF THE PREFERRED EMBODIMENT

Figure 1:
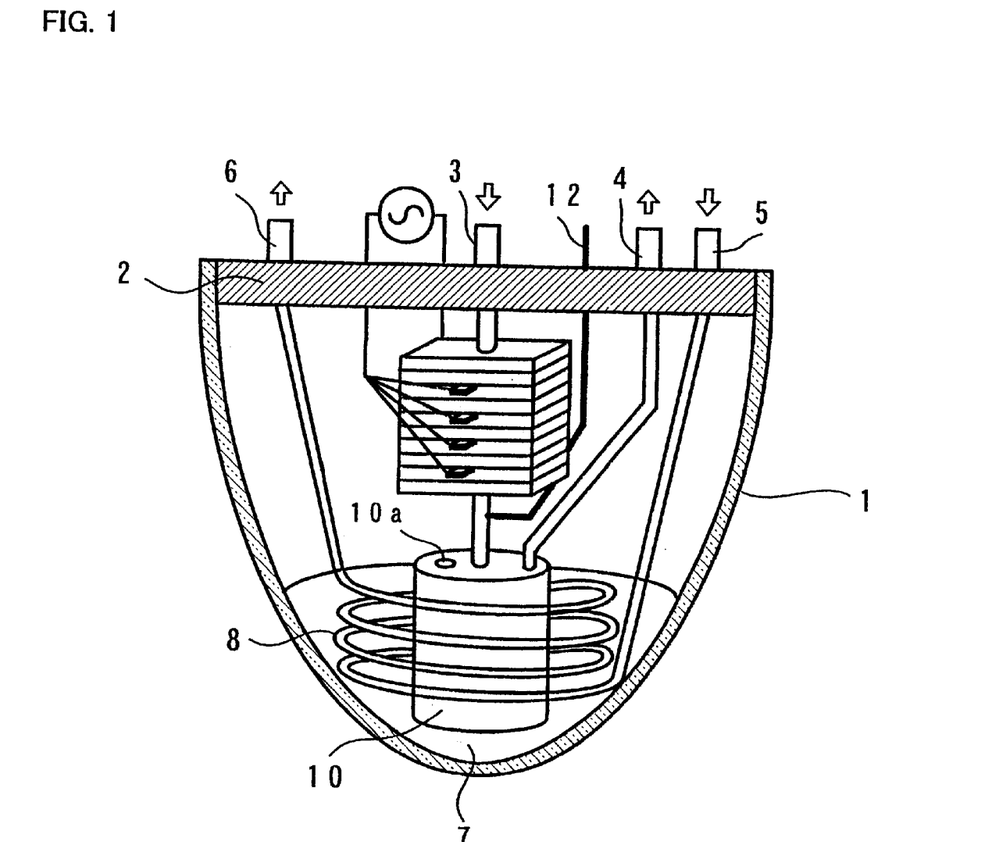
FIG. 1 shows an overall view of a continuous liquid pasteurizing apparatus according to the present invention.
Figure 2:
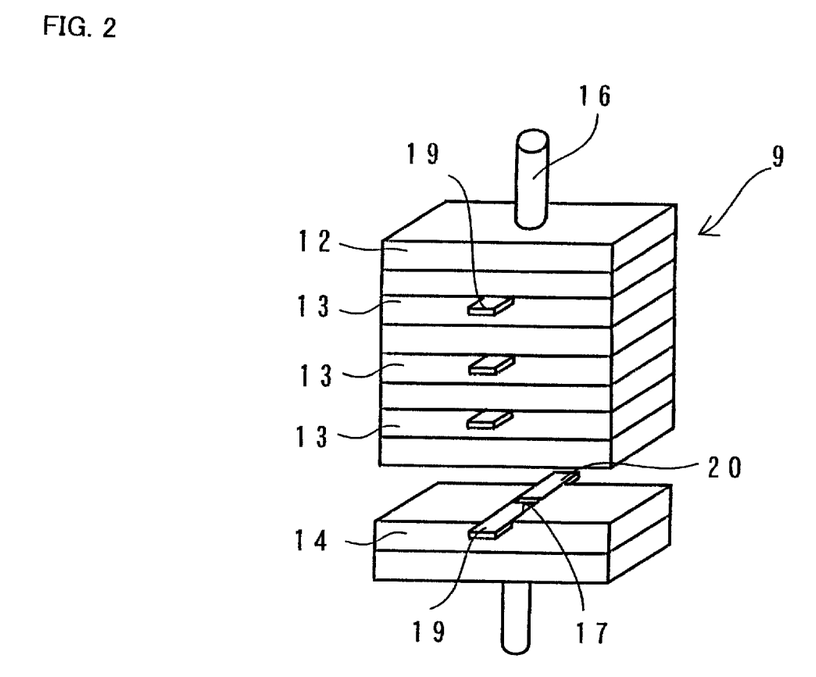
FIG. 2 shows a perspective view of an electricity conducting unit with an exploded portion thereof.

Hereinafter, detailed explanation of the embodiment according to the present invention will be given by referring to the attached drawings. Here, referring to FIG. 1 showing an overall view of a continuous liquid pasteurizing apparatus according to the present invention, a pressurized container 1 of glass is air-tightly sealed with a cover 2 at an upper opening thereof, and the cover 2 is provided with a supply opening 3, an outlet opening 4 for liquid, an inlet opening 5 for cooling water, and an outlet opening 6 therefor.

The pressurized container 1 is filled with cooling water 7 up to about a half (½) thereof, and for cooling the cooling water 7, there is provided or located inside the pressurized container 1 a cooling coil 8 into which a coolant (for example, water at 5° C.) flows. The cooling coil 8 has one end connected to the above-mentioned inlet opening 5 for the cooling water and the other end thereof connected to the above-mentioned outlet opening 6 for the cooling water.

Further, within the pressurized container 1, there is provided or located an electricity conducting unit 9 for pasteurizing liquid, an upper end portion of which is connected to the above-mentioned supply opening 3 for liquid, and a lower end portion of which is connected to a reservoir portion 10 being cooled by the cooling water 7.

However, it is also possible to take out the liquid directly from the lower end portion of the electricity conducting unit 9 through, e.g., a coil-like pipe, without providing the reservoir portion 10.

In the cover of the reservoir portion 10 there is formed an opening 10a, through which the inside of the reservoir portion 10 is maintained at the same pressure as that within the pressurized container 1. The pressure within the pressurized container 1 is selected so that the processed water does not boil due to the increase in temperature due to the pasteurization by electrical conduction. In the present embodiment, it is selected within a range 0.2 MPa–0.5 MPa.

Also, since the pressure within the pressurized container 1 is higher than that outside of the container (i.e., atmospheric pressure), by using that pressure difference, the liquid which is reserved into the reservoir portion 10 after being pasteurized is removed by opening the electromagnetic valve provided at a tip of the outlet opening for liquid through a conduit 11 to outside of the container 1, and it is further cooled to a predetermined temperature in a secondary cooling portion, which is not shown in the drawing but is provided outside the container 1.

However, the temperature of the liquid passing through the electricity conducting unit 9 is due to the electrical conduction, and the temperature of the liquid is measured by a thermocouple 12 after being pasteurized.

Next, the construction of the electricity conducting unit 9 will be explained by referring to FIGS. 2 through 6. The electricity conducting unit 9 is constructed by stacking an upper (top) insulator body 12, plural middle insulator bodies 13, 13, ... 13 and a lower (bottom) insulator body 14. The upper insulator body 12, middle insulator bodies 13 or lower (bottom) insulator body 14 are made from a plate of Teflon (tradename) material. The concrete sizes thereof are, e.g., 30 mm×30 mm×3 mm (height X width X thickness).

Figure 4:
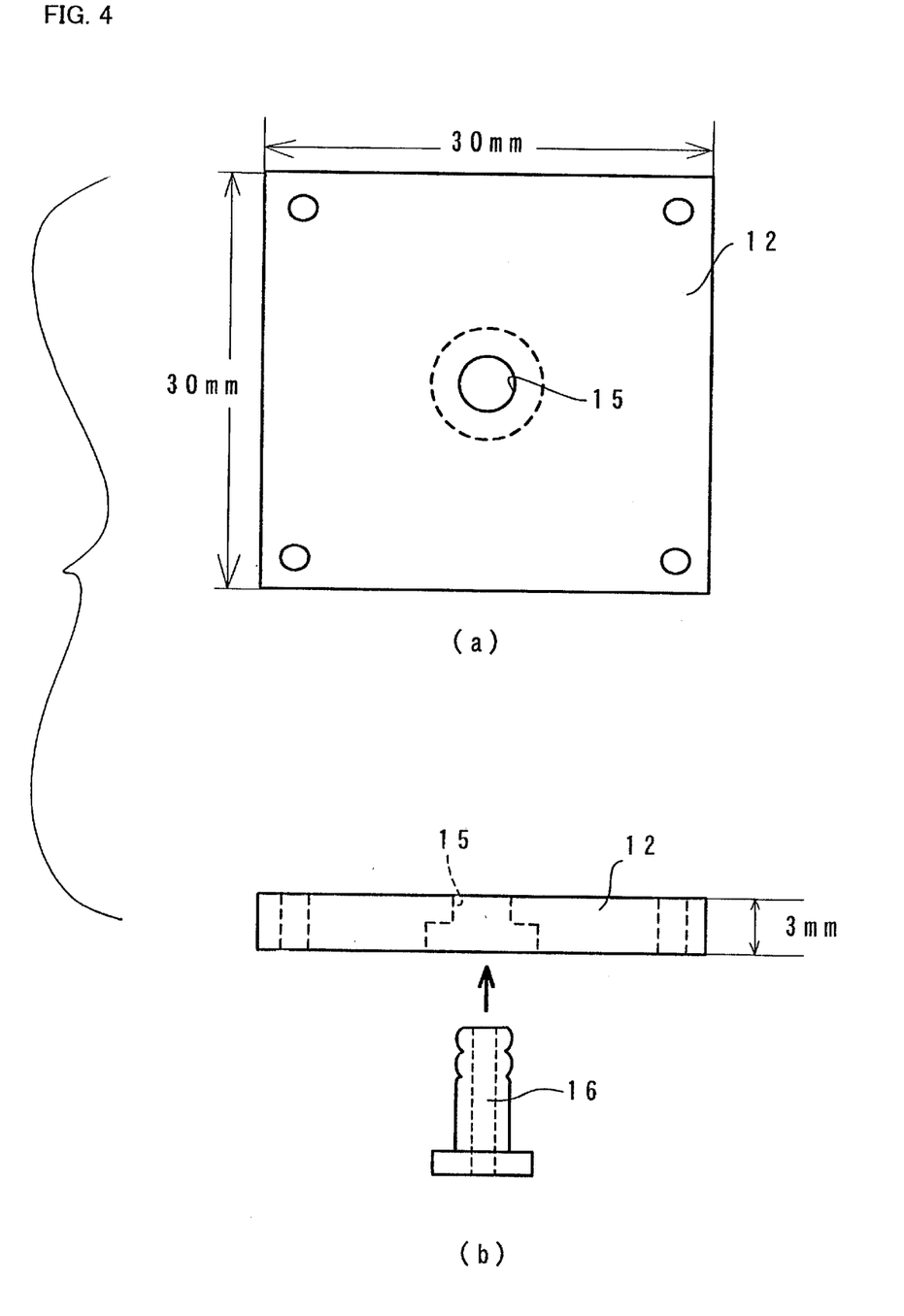
Figure 5:
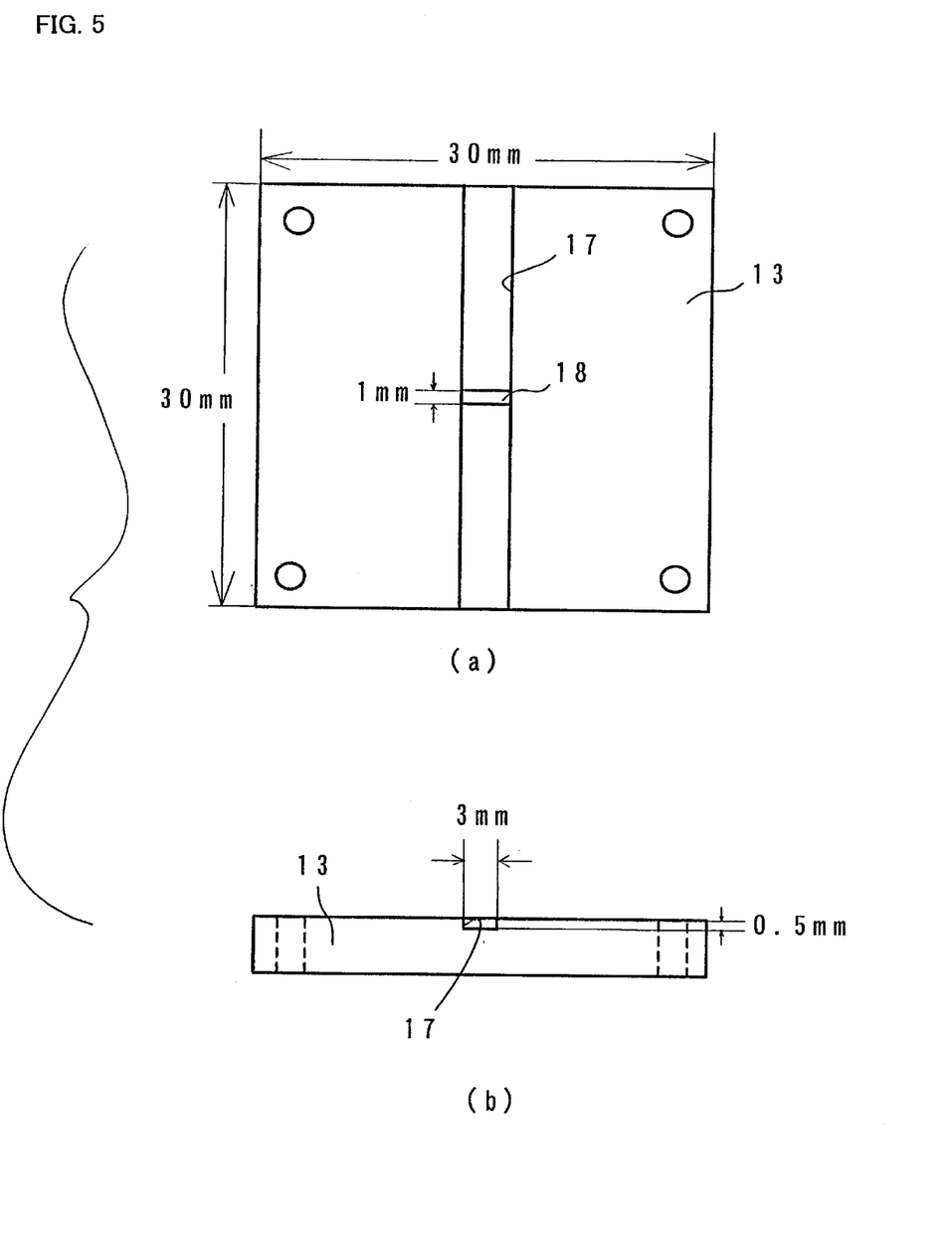
Figure 6:
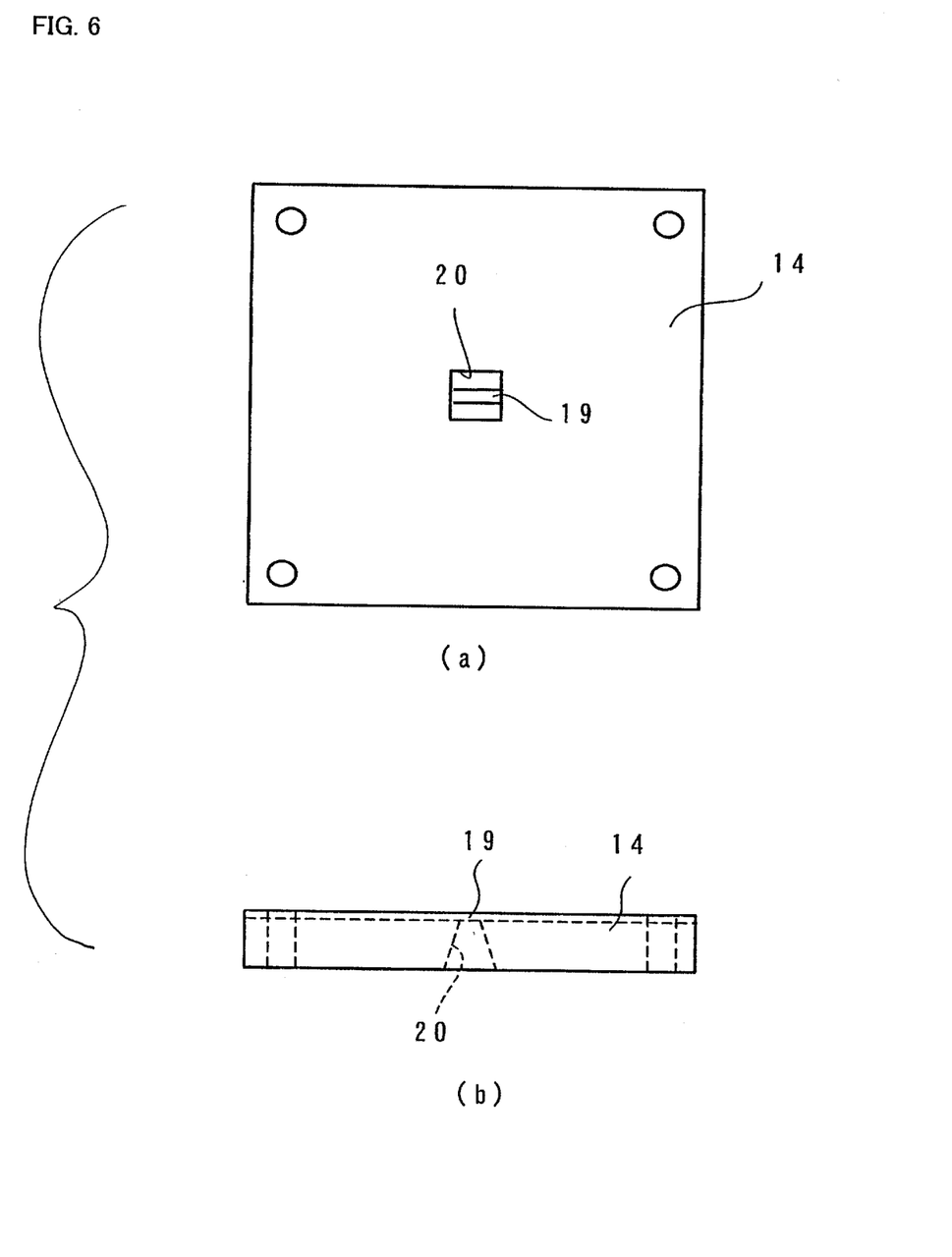

As shown in FIG. 4, at a central portion of the upper insulator body 12, there is formed a hole 15 having a step-like portion, and to the hole 15 having the step-like portion there is mounted a joint 16 which is connected to the above-mentioned supply opening 3. Further, plural pieces of the insulator bodies are used or piled up as the middle insulator bodies 13, 13, ..., and as shown in FIG. 5, on an upper surface of each of the middle insulator bodies 13, 13 ... there is formed a gutter portion 17 in a width of 3 mm and a depth of 0.5 mm. Further, at a central portion of the gutter portion 17 of each of the middle insulator bodies 13, there is formed a passage 18 having dimensions of 3 mm×1 mm. Furthermore, as shown in FIG. 6, also in the lower insulator body 14, there is formed a passage 19 which is connected to the above-mentioned passage 18, and a female tapered portion 20 is formed at a lower side thereof, which is connected to the passage 19.

Figure 3:
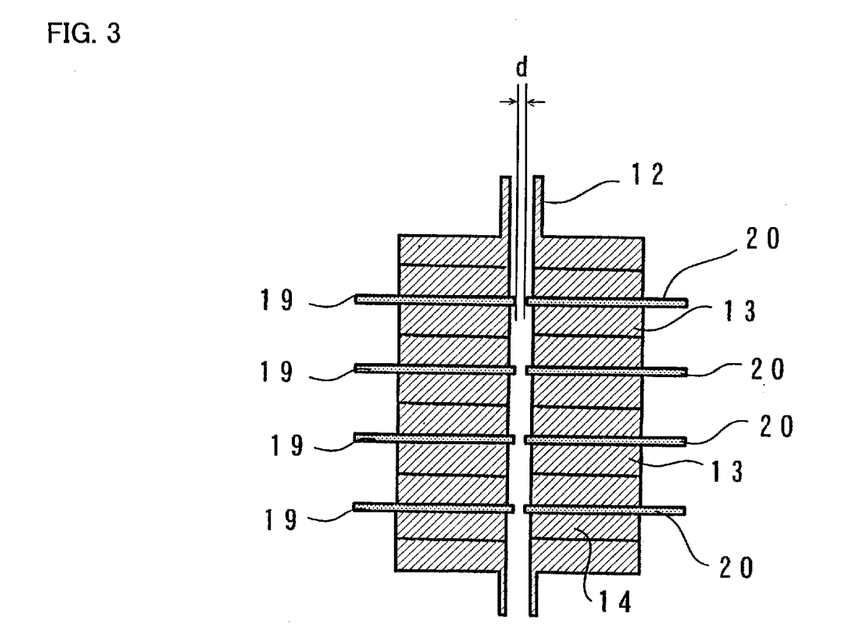
FIG. 3 shows a vertical cross section of the electricity conducting unit.

And, as shown in FIG. 3, a pair of plate-like titanium electrodes 19 and 20 are set into the gutter 17 of each middle insulator body 13, connected to an AC voltage source, so as to be put or inserted between the insulator bodies. The size of the titanium electrodes are, for example, in a length of 25 mm, a width of 3 mm, and a thickness of 1 mm, and they are chamfered with a round surface at the upper and lower corners at both ends thereof.

Also, the titanium electrodes 19 and 20 are located separated by a distance of about 6 mm in the vertical direction, and further a space or distance (d) between the tips of the electrodes 19 and 20 opposite to each other is selected to be equal or less than 1 mm, and preferably to be equal or less than 0.2 mm.

However, the relationship between the distance (d: mm) at the tips of the pairs of electrodes and the voltage (H: volt) to be applied thereto is: $200 \leq H/d \leq 2,000$, and more preferably is set to be: $400 \leq H/d \leq 1,600$ for obtaining a satisfactory pasteurizing condition.

When H/d is less than 200 (volt/mm), it is impossible to obtain satisfactory pasteurizing effects, while when it is greater than 2,000 (volt/mm), liquids—such as beer and so on—after being pasteurized, experience too great a rise in temperature, though it can be conceived that the higher the voltage applied, the greater more the pasteurizing effect.

Figure 7:
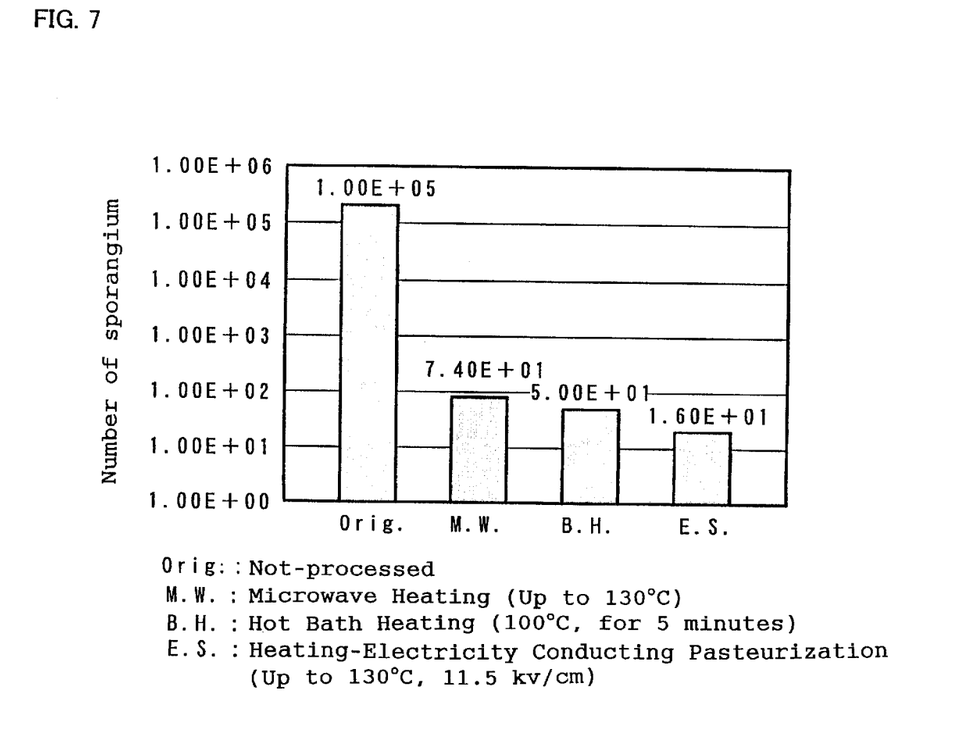
FIG. 7 shows a graph comparing the pasteurizing effect with respect to sporangium between the method of the present invention and those of the conventional art.
Figure 8:
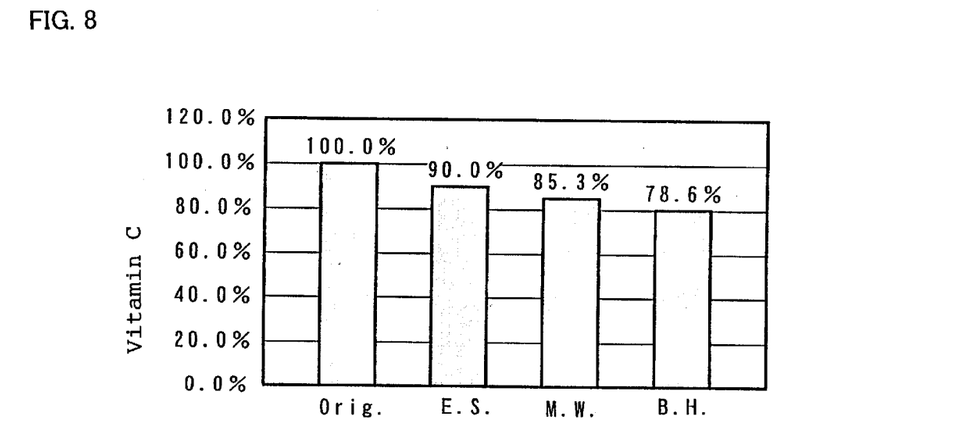
FIG. 8 shows a graph comparing the ratio of deleterious effects on vitamin C between the method of the present invention and those of the conventional art.

FIG. 7 shows a graph for comparing the pasteurizing effects, in particular for sporangium, between the method of the present invention and those of the conventional art; and FIG. 8 shows a graph for comparing in the ratio of deleterious effects on vitamin C between the method of the present invention and those of the conventional art.

From FIG. 7, it is apparent that the pasteurizing effect is increased greatly compared to those of conventional pasteurization using microwave heating and conventional pasteurization using hot-bath heating; in particular, effects of the pressurized and electrical pasteurization method of the present invention with respect to sporangium are markedly good. Further, from FIG. 8, it is also apparent that any deleterious effects on, e.g., vitamin C generated by the pressurized and electrical pasteurization method of the present invention are very small.

Though the electric field applied is selected to be 11.5 kV/cm for experimental purposes as shown in FIG. 7, the electric field applied is very effective if it is equal to or greater than 5 kV/cm. Further, the temperature and time for pasteurization, though being different depending upon the kinds or sorts of microbes or bacteria it is necessary to treat, are still effective or preferable to be lower than 130° C. and shorter than 10 seconds from the view point of reducing damage or deleterious effects on, e.g., vitamin C.

As is fully explained in the above, in accordance with the continuous liquid pasteurizing apparatus and the method thereof of the present invention, it is possible to effectively pasteurize microbes or bacteria having heat-resistance and/or pressure-resistance such as sporangium with a (relatively) low temperature or with a short time of maintaining a high temperature. Accordingly, quick, effective pasteurization is possible while preventing any heat-sensitive constituents—such as vitamin C—from being damaged or destroyed by the eat, and is very effective, in particular, for the pasteurization of fruit juices or the like. Although there have been described what are considered at present to be the preferred embodiments of the invention, it will be understood by persons skilled in the art that variations and modifications may be made thereto without departing from the spirit or essence of the invention. The scope of the invention is indicated by the appended claims, rather than by the foregoing description.

What is claimed is:

1. A continuous liquid pasteurizing apparatus, comprising:
   a pressurized container having a supply opening and an outlet opening for liquid; and
   an electricity conducting unit provided within said pressurized container, wherein a liquid passage is formed in said electricity conducting unit into which flows liquid supplied from said supply opening, which is confronted by at least a pair of electrodes which are connected to an alternating current voltage source.

2. A continuous liquid pasteurizing apparatus as defined in claim 1, wherein said pressurized container is further provided with a cooling means for cooling the liquid.

3. A continuous liquid pasteurizing apparatus as defined in claim 1, wherein said electricity conducting unit has a plurality of laminated insulating material layers, among which are inserted the electrodes.

4. A continuous liquid pasteurizing apparatus as defined in claim 1, wherein said pressurized container is further provided with a reservoir portion for reserving the liquid pasteurizes by said electricity conducting unit temporarily.

5. A continuous liquid pasteurizing method using the continuous liquid pasteurizing apparatus as defined in claim 1, including the steps of: continuously flowing the liquid through the container: applying an electric field equal to or greater than 5 kV/cm through said electricity conducting unit; and maintaining a pressure within said pressurized container equal to or greater than 0.2 MPa.

6. A continuous liquid pasteurizing apparatus as defined in claim 2, wherein said electricity conducting unit has a plurality of laminated insulated material layers, among which are inserted the electrodes.

7. A continuous liquid pasteurizing apparatus as defined in claim 2, wherein said pressurized container is further provided with a reservoir portion for reserving the liquid pasteurized by said electricity conducting unit temporarily.

8. A continuous liquid pasteurizing apparatus as defined in claim 3, wherein said pressurized container is further provided with a reservoir portion for reserving the liquid pasteurized by said electricity conducting unit temporarily.

9. A continuous liquid pasteurizing apparatus as defined in claim 6, wherein said pressurized container is further provided with a reservoir portion for reserving the liquid pasteurized by said electricity conducting unit temporarily.

10. A continuous liquid pasteurizing method using the continuous liquid pasteurizing apparatus as defined in claim 2, including the steps of: continuously flowing the liquid through the container; applying an electric field equal to or greater than 5 kV/cm through said electricity conducting unit; and maintaining a pressure within said pressurized container equal to or greater than 0.2 MPa.

11. A continuous liquid pasteurizing method using the continuous liquid pasteurizing apparatus as defined in claim 3, including the steps of: continuously flowing the liquid through the container; applying an electric field equal to or greater than 5 kV/cm through said electricity conducting unit; and maintaining a pressure within said pressurized container equal to or greater than 0.2 MPa.

12. A continuous liquid pasteurizing method using the continuous liquid pasteurizing apparatus as defined in claim 4, including the steps of: continuously flowing the liquid through the container; applying an electric field equal to or greater than 5 kV/cm through said electricity conducting unit; and maintaining a pressure within said pressurized container equal to or greater than 0.2 MPa.

13. A continuous liquid pasteurizing method using the continuous liquid pasteurizing apparatus as defined in claim 6, including the steps of: continuously flowing the liquid through the container; applying an electric field equal to or greater than 5 kV/cm through said electricity conducting unit; and maintaining a pressure within said pressurized container equal to or greater than 0.2 MPa.

14. A continuous liquid pasteurizing method using the continuous liquid pasteurizing apparatus as defined in claim 7, including the steps of: continuously flowing the liquid through the container; applying an electric field equal to or greater than 5 kV/cm through said electricity conducting unit; and maintaining a pressure within said pressurized container equal to or greater than 0.2 MPa.

15. A continuous liquid pasteurizing method using the continuous liquid pasteurizing apparatus as defined in claim 8, including the steps of: continuously flowing the liquid through the container; applying an electric field equal to or greater than 5 kV/cm through said electricity conducting unit; and maintaining a pressure within said pressurized container equal to or greater than 0.2 MPa.

16. A continuous liquid pasteurizing method using the continuous liquid pasteurizing apparatus as defined in claim 9, including the steps of: continuously flowing the liquid through the container; applying an electric field equal to or greater than 5 kV/cm through said electricity conducting unit; and maintaining a pressure within said pressurized container equal to or greater than 0.2 MPa.

* * * * *

UNITED STATES PATENT AND TRADEMARK OFFICE
CERTIFICATE OF CORRECTION

PATENT NO : 6,050,178
DATED : 18 April 2000
INVENTOR(S): Kunihiko Uemura

It is certified that error appears in the above-identified patent and that said Letters Patent is hereby corrected as shown below:

Column 1, line 30, change "surf ace" to --surface--.
Column 2, line 1, change "provided" to --provide--;
        line 35, delete "is".
Column 4, 32nd line, delete "more".
Column 5, line 1, change "eat" to --heat--; begin a new paragraph with "Although";
        31st line (claim 4, 4th line), change "pasteurizes" to --pasteurized--.

Signed and Sealed this

Twenty-seventh Day of February, 2001

Attest:

NICHOLAS P. GODICI

Attesting Officer

Acting Director of the United States Patent and Trademark Office